United States Patent [19] [11] 4,384,091
Korte et al. [45] May 17, 1983

[54] PROCESS FOR THE PRODUCTION OF POLYMERS CONTAINING ACRYLONITRILE

[75] Inventors: Siegfried Korte, Leverkusen; Theo Neukam, Dormagen; Carlhans Süling, Odenthal, all of Fed. Rep. of Germany

[73] Assignee: Bayer Aktiengesellschaft, Leverkusen, Fed. Rep. of Germany

[21] Appl. No.: 310,575

[22] Filed: Oct. 9, 1981

[30] Foreign Application Priority Data

Oct. 30, 1980 [DE] Fed. Rep. of Germany ....... 3040969

[51] Int. Cl.$^3$ .............................................. C08F 2/06
[52] U.S. Cl. .................................. 526/222; 526/230; 526/329.3; 526/262; 526/341; 526/342
[58] Field of Search ............... 526/230, 341, 222, 342

[56] References Cited

U.S. PATENT DOCUMENTS 3,879,360 4/1975 Patron et al. .................. 260/85.5 R
3,959,240 5/1976 Console et al. .................... 526/341

FOREIGN PATENT DOCUMENTS 2833143 2/1980 Fed. Rep. of Germany .
1337162 11/1973 United Kingdom .

Primary Examiner—Joseph L. Schofer
Assistant Examiner—Bernard Lipman
Attorney, Agent, or Firm—Sprung, Horn, Kramer & Woods

[57] ABSTRACT

Acrylonitrile polymers and copolymers with good affinity for basic dyes without sulfonic acid groups containing comonomers are obtained by polymerizing at a temperature of from 0° to 60° C. in an aliphatic hydrocarbon having a boiling point of from −10° to 80° C. or in a mixture of aliphatic hydrocarbons having boiling points in the range from −10° to 80° C. using an initiator system comprising from 0.1 to 8.0 mole percent of sulfur dioxide, from 0.1 to 2.0 mole percent of a hydroperoxide which is soluble in the reaction medium and from 0.01 to 1.0 mole percent of an acid which is soluble in the reaction system in that polymerization is carried out continuously and in that an average residence time of from 10 minutes to 2 hours is maintained.

7 Claims, No Drawings

PROCESS FOR THE PRODUCTION OF POLYMERS CONTAINING ACRYLONITRILE

This invention relates to a process for the production of polyacrylonitrile and copolymers predominantly containing acrylonitrile by polymerisation in aliphatic hydrocarbons in the presence of a redox catalyst.

German Offenlegungsschrift No. 28 33 143 describes the production of acrylonitrile polymers having an affinity for basic dyes, without using comonomers containing sulfonic acid groups, by polymerisation of acrylonitrile, either on its own or in the presence of other copolymerisable monomers free from sulfonic acid groups, in aliphatic hydrocarbons. This known process may be carried out either continuously or in batches with long residence times.

Although the resulting products have a surprisingly large content of groups with an affinity for basic dyes, it has been found that articles obtained from the polymers, for example fibres and filaments, are not entirely satisfactory after processing into sheet-form textiles. For example, light-coloured dye finishes are frequently uneven and streaky on account of the high dye uptake rate of the fibre material, even where cationic dyes characterised by a low uptake rate are used.

It has now been found that these disadvantages can be obviated by a specific improvement to the polymerisation process.

Thus, the present invention relates to a process for the production of polyacrylonitrile and copolymers predominantly containing acrylonitrile by polymerising acrylonitrile optionally together with up to 30% by weight of at least one olefinically unsaturated comonomer free from sulfonic acid groups at a temperature of from 0° C. to 60° C. in an aliphatic hydrocarbon having a boiling point of from −10° C. to 80° C. or in a mixture of aliphatic hydrocarbons having boiling points in the range from −10° C. to 80° C. using an initiator system comprising from 0.1 to 8.0 mole percent of sulfur dioxide, from 0.1 to 2.0 mole percent of a hydroperoxide which is soluble in the reaction medium and from 0.01 to 1.0 mole percent of an acid which is soluble in the reaction system (based in each case on the quantity of monomer used), characterised in that polymerisation is carried out continuously and that an average residence time of from 10 minutes to 2 hours is maintained.

The residence time is preferably between 20 and 70 minutes.

Another surprising advantage of the process according to the invention lies in the fact that, where short residence times are maintained during the polymerisation reaction, a readily filtrable grain is obtained and provides for problem-free further processing. For example, the sludge with precipitants still adhering to it can be immediately dissolved in suitable solvents. Although high volume-time yields can also be obtained in an aqueous medium, as described in German Auslegescrift No. 1,595,022, the residence time has a lower limit here of 45 minutes because greasy substrates which are difficult to filter are obtained even in this range. The process according to the invention is not subject to this limitation. Sulfonic acid groups are uniformly incorporated even with residence times of less than 45 minutes and comparatively low conversions, leading to higher fastness to light in the case of dyed articles.

Compared with the bulk polymerisation process according to German Auslegeschrift No. 2,120,337, the process according to the invention is distinguished by the fact that the reaction is easy to control, for example by dissipation of the heat generated during the polymerisation reaction.

The process according to the invention provides homopolymers and copolymers of acrylonitrile of the type described in German Offenlegungsschrift No. 28 33 143, page 7, last paragraph, but without their tendency towards uneven dyeing.

Compared with this prior process, the improved process according to the invention is further distinguished by a greater volume/time yield.

Suitable comonomers for the purposes of this invention are any olefinically unsaturated compounds which can be copolymerised with acrylonitrile and which are soluble in the aliphatic hydrocarbons used as precipitation medium or in their mixtures with acrylonitrile. Particularly suitable comonomers are the esters of acrylic acid and methacrylic acid, the vinyl esters of aliphatic carboxylic acids, styrene and styrene substituted by alkyl groups, for example α-methyl styrene or 4-tert-butyl styrene, also maleic acid anhydride and N-alkyl-substituted maleic acids imides. The advantage of the process according to the invention is reflected, inter alia, in the fact that it is also possible to use comonomers, such as maleic acid anhydride and maleic acid imides corresponding to the following general formula:

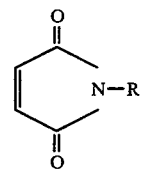

in which R represents a linear, branched or cyclo alkyl radical containing up to 12 C-atoms, preferably a methyl or cyclohexyl radical. When other production processes, for example polymerisation in aqueous media, are used, these monomers are incapable of adequate copolymerisation with acrylonitrile, particularly when high incorporation levels are required. In addition, where these special comonomers are used under polymerisation conditions which promote hydrolytic processes, products containing carboxyl groups are formed which are unsuitable for numerous applications on account of their poor natural colour and their inadequate thermal stability.

According to the present invention, maleic acid anhydride and also the maleic acid imides mentioned may even be copolymerised with acrylonitrile in combination with styrene in molar ratios of from 1:1 to 1:4.

The monomers copolymerisable with acrylonitrile mentioned above may be used in proportions of up to 30% by weight (based on the total weight of the monomer mixture). For certain applications, it is preferred to use polymers containing up to 15% by weight of comonomer.

The process according to the invention uses the technique of precipitation polymerisation, i.e. during the reaction the polymeric materials are precipitated by the mixture of aliphatic hydrocarbons and the monomers in the form of fine particles which are easy to filter. The ratio between the amount of monomer used and the quantity of aliphatic hydrocarbons should be adjusted according to the potential conversions which may vary in the range of from 30 to 85% by weight, but preferably reaches values of from 40 to 65% by weight. The proportion of monomers used in the reaction system amounts of between 7% and 35% by weight, and preferably to between 20% and 32% by weight.

The aliphatic hydrocarbons used as the reaction and precipitation medium may be employed in pure-form having defined boiling points in the range from $-10°$ C. to 80° C. or in the form of mixtures of the type obtained in standard refining techniques having boiling points in the range from $-10°$ C. to 80° C. Preferred aliphatic hydrocarbons are butane, pentane and cyclohexane and also a petroleum ether having a boiling point in the range from 40° to 80° C. and mixtures thereof.

An essential requirement of the process according to the invention is the use of a redox catalyst system which comprises sulfur dioxide, a hydroperoxide and an acid soluble in the system and which enables polymerisation to be carried out at a temperature in the range of from 0° C. to 60° C.

The sulfur dioxide may be added to the polymerisation mixture either in liquid form or in gaseous form in quantities of from 0.1 to 8.0 mole percent, based on the proportion of the monomers used.

Preferred hydroperoxides which are soluble in the reaction medium are hydroperoxides containing secondary and tertiary alkyl groups and hydroperoxides containing aralkyl groups, being used in quantities of from 0.1 to 2 mole percent. Such hydroperoxides may be obtained, for example, by alkylating hydrogen peroxide with suitable alkyl halides, dialkyl sulfates or alcohols in the presence of strong acids or by the addition of hydrogen peroxide to olefins. It is preferred to use tert.-butyl hydroperoxide and cumene hydroperoxide. The course of the polymerisation reaction and the properties of the polymers formed are critically determined by the ratio in which the two redox components $SO_2$/hydroperoxide are used. It has proved to be advantageous to adjust a molar ratio of from 1:1 to 6:1.

In addition, an acid soluble in the system is used with the two redox components, $SO_2$/hydroperoxide. This acid is, in particular, an organic acid used in a quantity of from 0.01 to 1.0 mole percent, preferably a partly halogenated or perhalogenated carboxylic acid containing up to 10 carbon atoms. Of these acids, trichloroacetic acid, perchloropropionic acid and perchlorobutyric acid are preferred. The carboxylic acids have a regulating effect on the initiation and molecule growth process during the polymerisation reaction. This ensures that the polymers produced have satisfactory thermal stability.

After filtration, washing and drying, the precipitation polymers obtained by the process according to the invention may be isolated in the form of fine powders having bulk densities of from 0.1 to 0.5 g/cc.

However, it is also possible directly to convert the polymer into a solution suitable for forming by subjecting the moist filter cake still containing aliphatic hydrocarbon and unreacted monomer to single-stage or multi-stage washing, optionally under pressure, using a low-boiling organic washing liquid which does not dissolve the polymer, directly introducing the filter cake thus pretreated into a suitable solvent for the polymer, separating off the washing liquid introduced with the polymer and minor residues of monomers in an evaporator and, at the same time, adjusting the solution to a concentration and viscosity suitable for forming. Suitable evaporators are, in principle, known types, for example, thin-layer evaporators, falling-film evaporators or evaporation screws.

Compared with conventional processes, this method avoids the need for an energy-intensive drying stage and eliminates the need for intermediately storing dry polymer. Irrespective of the techniques used for working up, the process according to the invention affords a simpler possibility of recycling all the components of the system.

The intrinsic viscosities [$\eta$] quoted in the Examples were measured on a 0.5% by weight solution in dimethyl formamide at 25° C. and are expressed in dl/g. For the definition of intrinsic viscosity, see H. G. Elias, Makromoleküle, Hütling and Wept-Verlag, Basel, page 265.

EXAMPLE 1

292.8 g of petroleum ether (b.p. 40°–80° C.), 0.25 g of trichloroacetic acid, 85.0 g of acrylonitrile (ACN), 6.5 g of acrylic acid methyl ester (ACME) and 0.61 g of 80% t-butyl hydroperoxide (t-BHP) are introduced into a 610 ml-capacity reactor. A solution of 12.2 g of ACN and 1.5 g of $SO_2$ (condensed) in 18.3 g of petroleum ether is then introduced with stirring under nitrogen at 37° C. 305 ml per hour (corresponding to one residence time unit in each case) of solution II and III specified below are then pumped in. After 3 residence time units, the mixture is in equilibrium. The amount of solids obtained per hour amounts to 73 g (68% of the theoretical yield), corresponding to a volume time yield of 120 g $1^{-1}h^{-1}$.

Solution II:

1225.0 g of petroleum ether, 396.0 g of ACN, 29.5 g of ACME, 1.5 g of trichloroacetic acid, 16.0 g of $SO_2$ (condensed).

Solution III:

1225.0 g of petroleum ether, 396.0 g of ACN, 29.5 g of ACME and 5.0 g of 80% t-BHP.

The polymer obtained has a [$\eta$]-value of 1.5, and S-content in % by weight of 0.22 and an ester-content of 5.8% by weight. The residence time is 1 hour.

EXAMPLE 2

The procedure was as described in Example 1; solutions II and III each being introduced in a quantity of 462 ml per hour. The residence time is 0.66 hour, the conversion 50% by weight and the yield 81 g. The polymer has an [$\eta$]-value of 1.3, an S-content of 0.26% by weight and a methyl-acrylate-content of 5.8% by weight.

EXAMPLE 3

The procedure was as described in Example 1; solutions II and III each being introduced in a quantity of 610 ml per hour.

The residence time was 0.5 hour, the conversion 30% by weight and the yield 64 g. The polymer has an [$\eta$]-value of 1.37, an S-content of 0.23% by weight and a methyl acrylate content of 5.7% by weight.

EXAMPLE 4

The procedure was as described in Example 1. The reactor had a volume for the reaction mixture of 1000 ml. The basic solution, starting solution, solution II and solution III had the following compositions:

|  |  | A | B |
|---|---|---|---|
| Basic solution: | petroleum ether (40–80° C.) | 500 g | 500 g |
|  | ACN | 159 g | 157 g |
|  | N—cyclohexyl maleic imide(N—CMI) | 2 g | 4 g |
|  | 80% t-BHP | 0.8 g | 0.8 g |
|  | trichloroacetic acid | 0.25 g | 0.25 g |
| Starting solution: | petroleum ether (40–80° C.) | 10 g | 10 g |
|  | ACN | 10 g | 10 g |
|  | SO$_2$ (condensed) | 3.45 g | 3.45 g |
| Solution II: | petroleum ether (40–80° C.) | 2600 g | 2610 g |
|  | ACN | 775 g | 703 g |
|  | N–CMI | 72 g | 144 g |
|  | trichloroacetic acid | 0.6 g | 0.6 g |
|  | SO$_2$ (condensed) | 34.5 g | 34.5 g |
| Solution III: | petroleum ether (40–80° C.) | 2530 g | 2530 g |
|  | ACN | 890 g | 890 g |
|  | 80% t-BHP | 8 g | 8 g |

Solution II and solution III were each introduced in a quantity of 1000 ml per hour.

In test A, a conversion of 37.1% by weight and a yield of 129 g are obtained for a residence time of 0.5 hour. The polymer has an [$\eta$]-value of 1.12, an S-content of 0.51% by weight, an acrylonitrile-content of 93.8% by weight and an N-CMI-content of 4.9% by weight.

In test B, a conversion of 42.9% by weight and a yield of 149 g were obtained for a residence time of 0.5 hour. The polymer had an [$\eta$]-value of 1.33, an S-content of 0.46% by weight, an acrylonitrile-content of 90.1% by weight and an N-CMI-content of 8.5% by weight.

EXAMPLE 5

The procedure was as described in Example 1; solutions II and III being introduced in a quantity of 76.25 ml per hour.

For a residence time of 4 hours, the yield amounts to 23.6 g and the conversion to 88%. The polymer has an [$\eta$]-value of 1.45, an S-content of 0.19% by weight and a methyl-acrylate-content of 5.6% by weight.

The polymers obtained were converted by standard methods into a 28% by weight dimethyl formamide spinning solution. After spinning and drawing in a ratio of 1:4, the filaments obtained were dyed in a single bath with the commercial dyes corresponding to formula A (red) and B (blue):

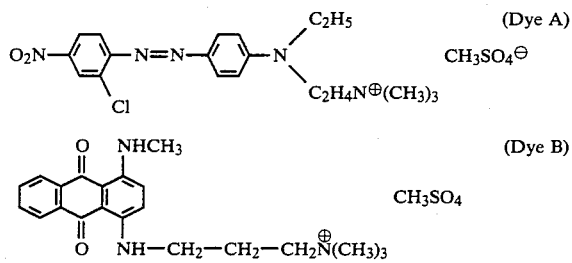

Dyeing was carried out under the following conditions: ratio of goods to liquor 1:23, pH-value 4.5, temperature 98° C. and addition of 0.5 g per liter of a standard commercial levelling agent.

The dye value was determined and defined as follows: approximately 10 mg of dyed fibre material are dissolved in 100 ml of absolute DMF and a sample of the resulting solution is introduced into a 1 ml cuvette (layer thickness 1 cm). Extinction was measured in a Perkin-Elmer PE 550 S two-beam extinction meter. The quotient of extinction and the amount of fibre weighed in is defined as the dye value and is shown in Tables 1a and 1a.

TABLE 1a

| | Dye A, filter 578 nm | |
|---|---|---|
| Example No. | Dye value (ext. · g$^{-1}$) | Residence time (h) |
| 1 | 7.52 | 1 |
| 2 | 13.20 | 0.66 |
| 3 | 9.03 | 0.5 |
| 4 A | 9.41 | 0.5 |
| 4 B | 8.73 | 0.5 |
| 5 | 6.64 | 4 |

TABLE 1b

| | Dye B, filter 492 nm | |
|---|---|---|
| Example No. | Dye value (ext. · g$^{-1}$) | Residence time (h) |
| 1 | 2.40 | 1 |
| 2 | 3.56 | 0.66 |
| 3 | 2.83 | 0.5 |
| 4 A | 2.61 | 0.5 |
| 4 B | 2.53 | 0.5 |
| 5 | 2.32 | 4 |

It can be seen from the above Tables that the dye values per g are better for Examples 1 to 4 according to the invention than for Comparison Example 5. In addition, Comparison Example 5 shows per meter of filament from 2 to 3 light-dark spots whilst the rest of the material is dyed completely uniformly.

We claim:

1. A process for the production of a polyacrylonitrile copolymer predominantly containing acrylonitrile units by polymerizing acrylonitrile containing up to 15 percent by weight of at least 1 olefinically unsaturated comonomer said monomer selected from the group consisting of alkyl esters of (meth)acyrlic acid and N-alkyl-substituted maleic acid imides, said comonomer being free from sulphonic acid groups, at a temperature of from 0° C. to 60° C. in an aliphatic hydrocarbon having a boiling point of from −10° to +80° C. or in a mixture of aliphatic hydrocarbons having boiling points in the range from −10° to +80° C. using an initiator system consisting essentially of from 0.8 to 8.0 mol percent of sulphur dioxide, from 0.1 to 2.0 mol percent of a hydroperoxide soluble in the reaction medium and from 0.01 to 1.0 mol percent of an acid soluble in the reaction system (based in each case on the quantity of monomer used), comprising polymerizing continuously with an average residence time from 10 to 70 minutes.

2. A process as claimed in claim 1, wherein the average residence time of from 20 to 70 minutes is maintained.

3. A process as claimed in claim 1, wherein the hydroperoxide is tert.-butyl hydroperoxide or cumene hydroperoxide.

4. A process as claimed in claim 1, wherein the acid soluble in the reaction system is a partly halogenated or perhalogenated carboxylic acid containing up to 10 carbon atoms.

5. A process as claimed in claim 1, wherein the solvent is butane, pentane, cyclohexane or a petroleum ether fraction having a boiling point in the range from 40° to 80° C. or a mixture thereof.

6. A process according to claim 1, wherein the residence time is up to 0.66 hour.

7. A process according to claim 1, wherein the reaction medium contains 7 to 35 percent by weight of monomer.

* * * * *